June 6, 1967     D. S. CHATTERTON ETAL     3,323,729
APPARATUS FOR DRYING HYDRATED GLUTEN
Filed March 31, 1964

INVENTORS
DAVID S. CHATTERTON
JOHN F. ZALAR
BY Robert B. Hughes
ATTORNEY

United States Patent Office 3,323,729
Patented June 6, 1967

3,323,729
APPARATUS FOR DRYING HYDRATED GLUTEN
David S. Chatterton, Minneapolis, and John F. Zalar, St. Paul, Minn., assignors to General Mills, Inc., a corporation of Delaware
Filed Mar. 31, 1964, Ser. No. 356,214
3 Claims. (Cl. 241—52)

This invention relates to an apparatus for drying hydrated wheat gluten.

Freshly prepared hydrated wheat gluten contains approximately two parts by weight of bound water to one part of bound gluten. The combination of the two takes the form of a rubbery cohesive gum-like mass which presents various problems when the same is being handled or processed as a part of a commercial drying operation. In terms of stability, a preferred condition of gluten is a dry powder (i.e. about 6–9% by weight moisture content), but there are problems involved in reducing the moisture content of a rubbery mass of hydrated gluten in an efficient and practical manner. Such problems have proved to be especially vexing when the dried gluten is to be used as a food product, since drying methods which expose the gluten to relatively high temperatures for any prolonged period will cause undesirable physical changes in the gluten. Conventional commercial methods of quick drying or "flash drying" different food products have, to the best knowledge of the applicants, generally proven to be inadequate for so drying hydrated gluten. Thus various approaches directed to this particular problem of drying gluten have appeared in the prior art. For example, United States Patent No. 3,094,421, issued June 18, 1963, discloses a method where the gluten is shredded directly into a hot air stream to be carried thereby to a disintegrator.

The present invention provides an efficient and generally advantageous method and apparatus for flash drying hydrated gluten. A very desirable feature of the present invention is that it accomplishes this drying by utilizing conventional apparatus (which would, in its conventional state, be inadequate for this operation) and adapting or modifying the same so that this modified apparatus works quite effectively in drying the gluten, without need of many of the encumbering devices or processing steps which appear in the prior art. As will be disclosed more fully hereinafter, this adaptation of conventional equipment is done in a structurally simple and inexpensive, yet very effective manner, so as to effect little, if any, interference with the desirable operating features which are generally incorporated or engineered in such conventional apparatus which has proved to be commercially practical.

Thus it may be declared as an object or objects of the present invention to accomplish the ends stated in the immediately preceding paragraph.

These and other objects and features of the invention will be more readily understood and appreciated from the following detailed description of the preferred embodiment thereof selected for purposes of illustration and shown in the accompanying drawings, in which.

Figure 1:
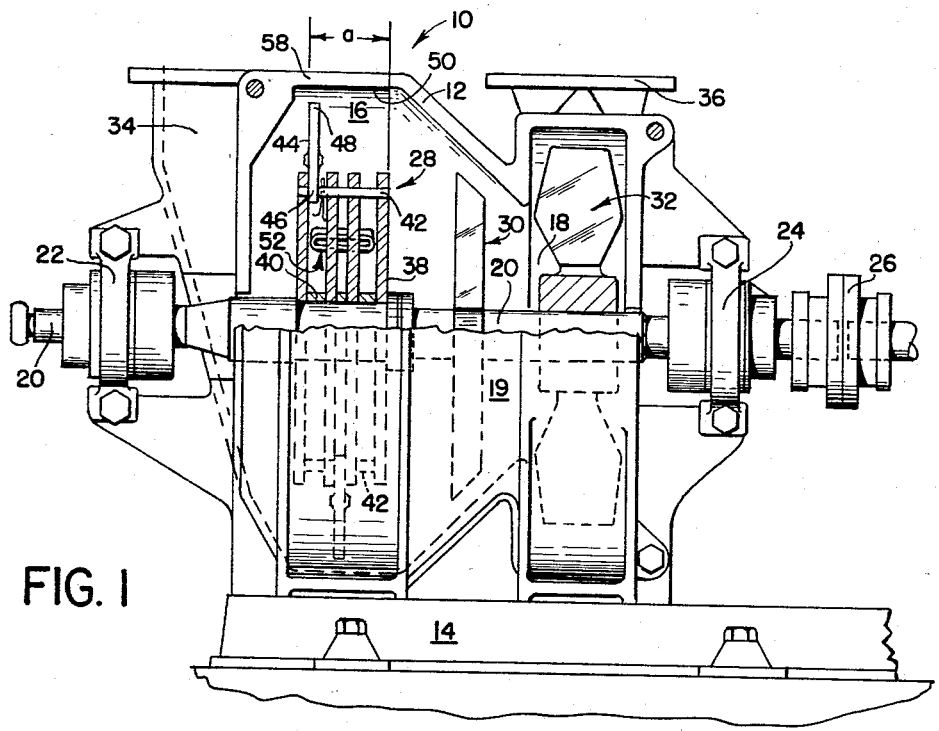
FIGURE 1 is a side view taken partly in section and partly in elevation, as along line 1—1 of FIG. 2.

The preferred embodiment of the present invention utilizes a particular impact mill (known as a "hammer mill") which has been found to be quite satisfactory, this being a hammer mill produced by Combustion Engineering, Inc., Raymond Division, of Chicago, Ill. and described in Catalog No. 67 at pages 1–16, and being identified by Model No. 10. Generally, the modification which is made to this hammer mill is to provide a feed nozzle with a restricted elongate outlet located closely adjacent to the periphery of the path described by the rotating hammers of the mill and directed into the path of such hammers. Stated in terms of process, the herein described preferred embodiment accomplishes this drying by feeding the hydrated gluten as a ribbon of moderate thickness along a path directly in the hammers of the mill, and restricting this ribbon of hydrated gluten (as by the feed nozzle to be described hereinafter) at a location closely adjacent to the periphery of the path of the hammers of the mill.

As illustrated in the accompanying drawings, numeral 10 designates generally an impact mill such as that specified in the immediately preceding paragraph. So that the novel features of the present invention will be more clearly understood, the major components which make up this conventional impact mill will first be described, both as to structure and to their conventional mode of operation, before the novel aspects of the present invention are disclosed. This impact mill 10 comprises a housing 12 which is mounted from a base 14 and which provides a chamber, which for purposes of description may be considered to consist of a front impact chamber 16, a rear discharge chamber 18, and a middle chamber 19 which opens to both the other chambers 16 and 18. Each of the chambers 16 and 18 has a generally cylindrical configuration and they are axially aligned with one another and with the chamber 19. However, the configuration of this middle chamber 19 is such that it converges to the rear (i.e. in a direction leading from the impact chamber 16 into the discharge chamber 18). As will be explained more fully hereinafter, this middle chamber 19 may be termed a "recycling chamber."

Extending through chambers 16, 18 and 19, and axially aligned therewith is a main drive shaft 20, journal mounted by its front and rear ends at 22 and 24, respectively, to the housing 10. This shaft 20 is driven from a suitable power source (not shown herein) through a coupling 26. Fixedly mounted to, and concentric with, the drive shaft 20 are: (1) an impact assembly, generally designated 28, and located in the impact chamber 16, (2) a "whizzer" 30 which comprises a plurality of radially extending blades and is located in the convergent recycling chamber 19 and (3) a fan 32 which is located in the discharge chamber 18 and functions to draw air into and through the impact chamber 16 and recycling chamber 19, to be discharged with the material processed in the mill 10 through the chamber 18. Thus there is provided in the housing 12 a front inlet 34 and a rear outlet 36. The outlet 36 is tangentially aligned with the discharge chamber 18, while the inlet 34 is generally tangentially aligned with the impact chamber 16, but is also spaced moderately forward thereof.

The impact unit 28 comprises a plurality (four, as shown herein) of mounting discs 38 keyed to (at 40) the shaft 20 and concentric therewith. These discs 38 are moderately spaced axially one from another, and have a plurality of mounting pins 42 extending therethrough, these pins 42 being evenly spaced about the entire periphery of the discs 38. A plurality of impact hammers 44 are swing mounted by their respective root ends 46 to the pins 42 so that during the normal operation of the mill 10, the hammers 44, because of the centrifugal force created by the rotation of the shaft 20 and unit 28, reach radially outwardly from the periphery of the discs 38. Each of the hammers 44 is mounted either between the front, middle or rear pair of discs 38, and the spacing and mounting of the hammers 44 is such, that the impact unit 28 is dynamically balanced with respect to the longitudinal axis thereof (which is the axis of the shaft 20).

In the particular impact mill illustrated herein, the diameter of the impact unit 28 (taken from the outer tips 48 of the hammers 44 when these hammers 44 are extending radially outward) is about 24 inches, while the inside diameter of the housing portion defining the impact chamber 16 is about 26 inches. Thus there is a moderate clearance (about 1 inch) between the outer tips 48 of the hammers 44 and the inner cylindrical surface 50 of the housing 12 at the location of the impact chamber 16.

Figure 2:
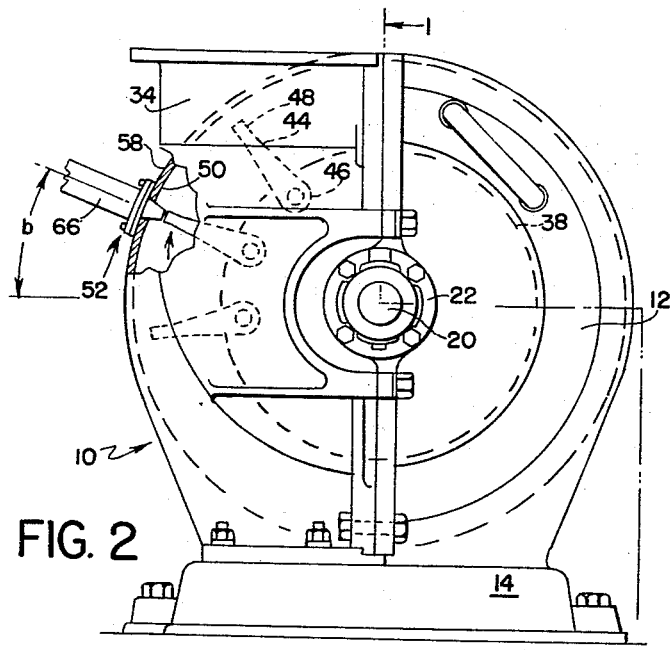
FIG. 2 is a front elevational view of the apparatus of the present invention.
Figure 4:
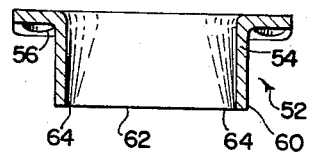
FIG. 4 is a sectional view taken on line 4—4 of FIG. 3.
Figure 3:
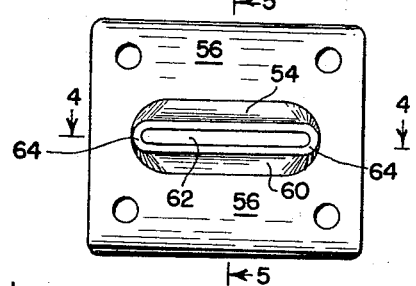
FIG. 3 illustrates a feed nozzle provided by the present invention, this view being taken from a location looking directly into the outlet portion of this feed nozzle.
Figure 5:
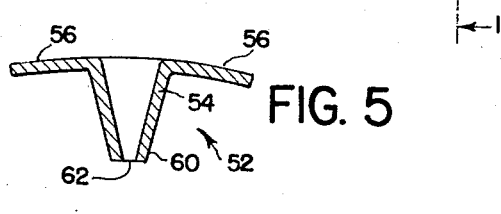
FIG. 5 is a sectional view taken on line 5—5 of FIG. 3.

In the detailed description up to this point, only conventional components of the impact mill 10 have been discussed. In the usual operation of this mill 10, the shaft 20 is driven under power (clockwise as seen in FIG. 2), this causing the impact unit 28, whizzer 30 and fan 32 also to rotate. The action of the fan 32 discharges air through the outlet 36, and thus causes air to be drawn in through the inlet 34, through the chambers 16, 19, and 18 to be discharged at the outlet 36. Material to be impacted is ordinarily fed by conventional means into the impact chamber 16, usually through the inlet shown at 34. The rotating hammers 44 break this material into smaller particles which are carried by the air stream toward the discharge chamber 18. The rotating action of the whizzer 30 causes the coarser particles of material moving into the recycling chamber 19 to be moved to the periphery of the recycling chamber 19 and then forward to return into the area of the impact chamber 16 to be again impacted by the hammers 44, while the finer particles are carried by the air stream through the recycling chamber 19, into the discharge chamber 18 and thence through the outlet 36.

The location of the whizzer 30 along the length of the shaft 20 can be adjusted, within moderate limits, forwardly or rearwardly. By locking the whizzer 30 at a further rearward location so that there is less clearance between the periphery of the whizzer 30 and the wall of the housing 12, only the finer particles are permitted to pass into the discharge chamber 18, while locating the whizzer 30 further forward permits relatively coarser particles to pass into the discharge chamber 18. In operating the mill in accordance with the teachings of the present invention, the whizzer 30 is set at a location at the rear of the recycling chamber 19 so as to have a relatively higher rate of recycling of the gluten particles in the mill 10.

When it is desired to accomplish "flash drying" by means of this mill 10, according to the conventional operation thereof, hot air is fed into the inlet 34. The material to be flash dried is dispersed by the action of the impact unit 28, and is generally, also broken down to some degree into smaller particles. In this manner, each increment of material fed into the mill 10 is quickly dried and discharged with relative rapidity from the mill 10.

As previously indicated, attempts to flash dry hydrated gluten according to conventional commercial procedures have proved largely to be inadequate. Accordingly, the present invention provides certain hereinafter described novel improvements which are especially advantageous in the accomplishment of such flash drying of hydrated gluten.

The present invention provides a feed nozzle, generally designated 52, by which the hydrated gluten (i.e. gluten which is bound with water in the proportion of about two parts water to one part gluten) is fed into the impact chamber 16. The base portion 54 of the nozzle 52 is provided with a mounting flange 56 by which it is secured to the cylindrical housing wall portion 58 which surrounds the impact unit 28. The nose or discharge end 60 of the nozzle 52 reaches through the wall 58 so as to be spaced moderately inwardly therefrom, and into the peripheral portion of the chamber 16 to terminate a very short distance radially outward from the periphery of the impact unit 28. That is to say, the path of the tip ends 48 of the hammers 44 pass closely adjacent to the nozzle discharge end 60. Clearances of 1/16 inch, 1/8 inch and also of 1/4 inch, measured between the nose end 60 of the nozzle 52 and the tip ends 48 of the hammers 44, have been proven to be satisfactory for the particular apparatus illustrated herein. However, with a 1/4 inch clearance, some surging was noted in the operation of the mill. That is to say, there was an audible difference in the operation of the mill 10 and the ammeter reading of the power input for the mill 10 would fluctuate to a moderate degree, which would seem to indicate that there was some moderate "slugging" or "lumping" of the gluten in the mill 10. However, at clearances of 1/16 inch and 1/8 inch, the mill 10 ran very smoothly.

The discharge end or nose 60 of the nozzle 52 faces directly toward the center axis of the impact unit 28 so that the gluten is discharged from the nozzle 52 into the chamber 16 along a path which is perpendicular to, and thus directly into, the path of the hammers 44 at the location of the nozzle 52. It will be noted that the discharge opening 62 of the nozzle 52 is elongate, having a width of approximately 3/16 of an inch, and a length of about 2½ inches. The nozzle 52 is so situated that the lengthwise dimension of the nose opening 62 is parallel to the center axis of the impact unit 28 and thus perpendicular to the path of the hammers 44 at the location of the nozzle 52. The peripheral width of the cylindrical path of the hammer tips 48 (this being shown at "$a$" in FIGURE 1) is about 4 inches and the length of the nose opening 62 is centered with respect to this dimension "$a$," so that the edges 64 of the nose opening 62 lie within the front and rear limits of the path of the hammer tips 48.

As illustrated in FIGURE 2, the nozzle 52 is mounted on that portion of the housing wall 58 adjacent to which the hammers 44 are moving upwardly on their path of rotation. Also the location of the nozzle 52 is moderately above the center axis of the impact unit 28, with the result that whatever effect gravity might have on the ribbon of gluten being discharged from the nozzle 52 would be to cause the gluten to fall along a resultant path having a first path component perpendicular to the path of the hammers 44 and a second path component directly opposite such path of the hammers 44 at the location of the nozzle 52. In the particular apparatus shown herein, a satisfactory location for the nozzle 52 is such that the angle defined by a horizontal line and a second line reaching from the nozzle 52 to the center axis of the impact unit 28 (which angle is shown at "$b$" in FIGURE 2) is about ¼ of a right angle, or about 22½°.

Suitable feed means (e.g. an auger feed device) is used to push the hydrated gluten through the nozzle 52, such feed means being shown semi-schematically at 66.

To begin operation of the apparatus, the feed mechanism 66 and the nozzle 52 are filled with hydrated gluten, the mill 10 is started (i.e. the shaft 20, along with the impact unit 28, the whizzer 30 and fan 32 is rotated under power), and dry gluten is fed into the impact chamber 16 through the inlet 34 for about four to six minutes at the rate of about one pound a minute, or at least until there is a sufficient build-up of dry gluten in the impact chamber 16. After this build-up period of dry gluten in the impact chamber 16, the hydrated gluten is then fed into the impact chamber 16 through the nozzle 52. About a minute after the time the hydrated gluten is begun to be fed into the chamber 16, the feed of dry gluten into the impact chamber 16 is shut off, and thereafter only hydrated gluten is fed into the mill 10 through the nozzle 52. The hydrated gluten (i.e. gluten bound with water in the ratio of about one part gluten to two parts water) is fed continuously through the nozzle 52 at a rate of about 180 to 200 pounds (this weight including the weight of the water) per hour. The shaft 22 with the impact unit 28, whizzer 30 and fan 32 is rotated at about 3600 revolutions per minute (which is the desired operating speed of the particular impact mill shown herein). The air which is drawn into the inlet 34 is heated to a temperature of about 200° F., and the volume of air flow through the mill 10 is about 1300 cubic feet per minute. The hydrated gluten emerges from the nose 60 of the nozzle 52 as a continuous ribbon of moderate thickness (i.e. about 3/16 of an inch), with the width dimension (which is about 2½ inches) extending perpendicular to the path of the hammers 44 at the location at which gluten is fed into the path of the hammers 44. The result is that the hydrated gluten (having a moisture content of about 66%) passes through the mill 10 and emerges from the discharge outlet 36 as a dry (moisture content of about 6 to 9%) powder. Suitable means can then be used to collect the dry gluten so discharged.

The whizzer 30 performs a continuous recycling function in that a portion of the gluten from the impact chamber 16 is recirculated by the action of the whizzer 30 back to the impact chamber 16. Thus there is a constant mixing of the hydrated gluten (i.e. having about 66% water) with gluten that is being recycled and is of a lower moisture content and less sticky character, than the hydrated gluten fed immediately from the nozzle 52. It is to be understood that this constant recycling can be accomplished in some other manner, and that other recycling methods are well known in the art. For example, a recycling chamber can be placed at a location remote from the impact chamber and be connected to a discharge chamber by a first passage to receive gluten from the impact chamber, with a portion of the gluten being recycled from such recycling chamber through a second passage back to the impact chamber.

It should be understood that the foregoing is merely illustrative of a certain embodiment of the invention and many variations may be made by those skilled in the art without departing from the spirit and scope of the invention.

Now therefore we claim:

1. In an impact mill comprising a housing defining an impact chamber, impact means which moves within said chamber along a predetermined circular path to impact material in said chamber, said housing providing air inlet and outlet means communicating with said chamber so that air is able to circulate into said chamber and out therefrom, and recycling means to recycle back to said impact means a portion of material passing from said impact means, the improved combination comprising a feed nozzle which projects through a wall portion of said housing into said chamber, said nozzle having an elongate discharge end with an elongate opening therein, said nozzle projecting into the chamber in such a manner that said end is directed toward the center axis of the mill and it terminates proximate the circular path traveled by the impact means so that material passing through said nozzle and said discharge end is impacted by said impact means after a very short path of travel from said end, the opening in said discharge end being elongated along a line generally perpendicular to the direction of travel of said impact means proximate said opening, the length of said opening being substantially greater than its width.

2. The combination of claim 1 wherein the distance between the discharge end of the nozzle and the circular path traveled by the impact means is at least 1/16 inch and not more than 1/4 inch, the impact means rotates about a horizontal axis, and the nozzle is positioned in said housing at a location adjacent to which the impact means travel upwardly on their path of rotation, said location being above the center axis of the impact mill.

3. The combination of claim 1 wherein the length of the discharge opening is at least ten times greater than its width, and the material is discharged through the nozzle opening in the form of a continuous sheet.

References Cited
UNITED STATES PATENTS

| | | | |
|---|---|---|---|
| 1,560,766 | 11/1925 | Crites | 241—186 X |
| 1,991,899 | 2/1935 | Holbeck | 241—56 X |
| 2,287,799 | 6/1942 | Hartshorn | 241—186 |
| 2,662,694 | 12/1953 | Lotz | 241—56 X |
| 2,699,898 | 1/1955 | Rogers | 241—56 X |
| 2,785,865 | 3/1957 | Berling | 241—186 |
| 2,805,493 | 9/1957 | Bestehorn | 34—130 |
| 3,094,421 | 6/1963 | Parker | 99—199 |

WILLIAM W. DYER, JR., *Primary Examiner.*

RAYMOND N. JONES, *Examiner.*